(12) United States Patent  
Yaginuma et al.

(10) Patent No.: US 11,959,844 B2  
(45) Date of Patent: Apr. 16, 2024

(54) AUTOMATIC ANALYZER, COOL BOX, AND POUCH

(71) Applicant: JEOL Ltd., Tokyo (JP)

(72) Inventors: Takashi Yaginuma, Tokyo (JP); Kiyohiro Ishikawa, Tokyo (JP); Yusuke Yamanaka, Tokyo (JP)

(73) Assignee: JEOL Ltd., Tokyo (JP)

( * ) Notice: Subject to any disclaimer, the term of this patent is extended or adjusted under 35 U.S.C. 154(b) by 210 days.

(21) Appl. No.: 17/389,653

(22) Filed: Jul. 30, 2021

(65) Prior Publication Data  
US 2022/0042888 A1 Feb. 10, 2022

(30) Foreign Application Priority Data

Aug. 7, 2020 (JP) ................. 2020-134842

(51) Int. Cl.  
*B01L 3/00* (2006.01)  
*B01L 7/00* (2006.01)  
(Continued)

(52) U.S. Cl.  
CPC .............. *G01N 1/42* (2013.01); *B01L 3/505* (2013.01); *B01L 3/52* (2013.01); *B01L 7/00* (2013.01);  
(Continued)

(58) Field of Classification Search  
CPC .... B01L 3/52; B01L 3/505; B01L 7/00; B01L 2035/00435; B01L 2300/042;  
(Continued)

(56) References Cited

U.S. PATENT DOCUMENTS 4,364,234 A * 12/1982 Reed .................. F25B 21/02  
165/265  
2004/0187451 A1* 9/2004 Suzuki ............. H01L 21/67772  
55/385.6  
(Continued)

FOREIGN PATENT DOCUMENTS

JP  3044054 5  12/1997  
JP  2011117802 A * 6/2011  
(Continued)

OTHER PUBLICATIONS

Office Action issued in JP2020134842 dated Oct. 4, 2022.  
Partial European Search Report issued in EP21187278.3 dated Jan. 3, 2022.

*Primary Examiner* — Jill A Warden  
*Assistant Examiner* — Michael Stanley Gzybowski  
(74) *Attorney, Agent, or Firm* — The Webb Law Firm

(57) ABSTRACT

There is provided a cool box for use in an automatic analyzer. The cool box has a box body and an air circulator. The box body has a receiving space capable of accommodating therein receptacles for analytes or reagents. The circulator has an intake portion, a fan, and an exhaust portion and operates to circulate air in the receiving space by rotation of the fan. The circulator further includes an inhibitor removing agent retaining portion on which a pouch is set. The pouch contains an analysis inhibitor removing agent for removing components (analysis inhibitor) which adversely affect or inhibit analysis of the analytes.

13 Claims, 16 Drawing Sheets

(51) Int. Cl.
*G01N 1/34* (2006.01)
*G01N 1/42* (2006.01)
*G01N 35/00* (2006.01)
*G01N 35/10* (2006.01)

(52) U.S. Cl.
CPC ............... *B01L 13/02* (2019.08); *G01N 1/34* (2013.01); *G01N 35/00584* (2013.01); *G01N 35/10* (2013.01); *B01L 2300/042* (2013.01); *B01L 2300/069* (2013.01); *B01L 2300/105* (2013.01); *B01L 2300/1894* (2013.01); *G01N 2035/00435* (2013.01)

(58) Field of Classification Search
CPC ......... B01L 2300/069; B01L 2300/105; B01L 2300/1844; B01L 2300/1894; G01N 1/34; G01N 1/42; G01N 30/14; G01N 35/10; G01N 35/00584; G01N 2030/143
See application file for complete search history.

(56) References Cited

U.S. PATENT DOCUMENTS

| | | | |
|---|---|---|---|
| 2010/0000413 A1* | 1/2010 | Turner | A61L 9/122 55/471 |
| 2010/0248346 A1* | 9/2010 | Kaneko | B01L 7/02 422/68.1 |
| 2011/0223064 A1 | 9/2011 | Katsumi et al. | |
| 2015/0367052 A1* | 12/2015 | Gerber | A61M 1/14 210/263 |

FOREIGN PATENT DOCUMENTS

| | | | | |
|---|---|---|---|---|
| JP | 2011117802 A | | 6/2011 | |
| JP | 2011191114 A | | 9/2011 | |
| JP | 2012112730 A | | 6/2012 | |
| JP | 2012233923 6 | | 11/2012 | |
| JP | 2014217811 | | 11/2014 | |
| JP | 2017150871 A | * | 8/2017 | |
| JP | 2017150871 A | | 8/2017 | |

* cited by examiner

AUTOMATIC ANALYZER, COOL BOX, AND POUCH

CROSS-REFERENCE TO RELATED APPLICATION

This application claims priority to Japanese Patent Application No. 2020-134842 filed Aug. 7, 2020, the disclosure of which is hereby incorporated by reference in its entirety.

BACKGROUND OF THE INVENTION

1. Field of the Invention

The present invention relates to an automatic analyzer, a cool box, and a pouch.

2. Description of the Related Art

An automatic analyzer is an apparatus for quickly and accurately analyzing various components of an analyte that is handled as a specimen. Such automatic analyzers are used in various applications including biochemical tests and blood transfusion tests. An automatic analyzer is equipped with a cool box for receiving receptacles (hereinafter may also be referred to as liquid receptacles) that accommodate liquid. Liquid contained in liquid receptacles is kept cool by the cool box to prevent the liquid handled by the automatic analyzer from deteriorating. Examples of liquids handled by automatic analyzers include analytes to be analyzed and reagents used for analysis of analytes.

A receptacle for receiving a reagent may hereinafter be referred to also as a reagent receptacle. A cool box for receiving a reagent receptacle may also be referred to as a reagent storage unit or reagent cooling box. With respect to reagent storage units, there is known a technique which is set forth, for example, in JP-A-2011-117802. In view of the circumstances in which reagent components evaporating from reagent receptacles may deteriorate reagents received in other reagent receptacles, JP-A-2011-117802 sets forth a technique of forming a ventilation port in the peripheral wall of a cool box case and of providing blade members rotating integrally with a rack on which the reagent receptacles are placed. Furthermore, in the technique set forth in JP-A-2011-117802, a filter that adsorbs or decomposes chemical substances is mounted to the inner surface of a cover-like member that provides a cover over the top opening of the reagent storage unit casing.

However, in the technique set forth in JP-A-2011-117802, the ventilation port for placing the inside and outside of the reagent storage unit casing in communication with each other is formed in the peripheral wall of a cool box casing to permit evaporating reagent components to be exhausted out of the reagent storage casing. Consequently, the presence of the ventilation port decreases the sealability of the reagent storage unit. Furthermore, in the technique set forth in JP-A-2011-117802, reagent components staying in the upper layer within the reagent storage unit casing are moved toward the ventilation port by rotation of the blade members. However, in order to efficiently exhaust the reagent components to the outside of the reagent storage unit casing through the ventilation port, it is necessary that the peripheral wall of the reagent storage unit casing be provided with a plurality of such ventilation ports. This will further decrease the sealability of the reagent storage unit.

In the technique set forth in JP-A-2011-117802, the filter is placed horizontally relative to the direction of movement of air flow caused by rotation of the blade members rather than vertically. Therefore, a larger portion of the reagent components evaporating inside the reagent storage unit casing does not flow into the filter but flows toward the exhaust port along the surface of the filter together with air flow. Consequently, it is impossible to remove the reagent components efficiently with the filter.

SUMMARY OF THE INVENTION

It is an object of the present invention to provide a technique capable of suppressing decrease in the sealability of the cool box and simultaneously of enhancing the rate at which components adversely affecting analyte analysis are removed.

The present invention provides an automatic analyzer which is used to analyze analytes and which is equipped with a cool box. The cool box has a box body and at least one air circulator. The box body has a receiving space capable of accommodating therein receptacles for receiving liquid. The air circulator has an intake portion, a fan, and an exhaust portion. The air circulator sucks air from the receiving space through the intake portion and exhausts the sucked air into the receiving space through the exhaust portion by rotation of the fan, whereby circulating the air inside the receiving space. The air circulator further includes at least one agent retaining portion on which an inhibitor removing agent is set, the removing agent acting to remove components (herein may also be referred to as the analysis inhibitor) adversely affecting or inhibiting analysis of the analytes. The at least one agent retaining portion is formed in at least one of the intake portion and the exhaust portion.

The present invention also provides a cool box for use in an automatic analyzer which is operated to analyze analytes. The cool box has a box body and at least one air circulator. The box body has a receiving space capable of accommodating therein receptacles for receiving liquid. The air circulator has an intake portion, a fan, and an exhaust portion. The air circulator sucks air from the receiving space through the intake portion and exhausts the sucked air into the receiving space through the exhaust portion by rotation of the fan, whereby circulating the air inside the receiving space. The air circulator further includes at least one agent retaining portion on which an analysis inhibitor removing agent is set, the agent acting to remove components adversely affecting or inhibiting analysis of the analytes. The at least one removing agent retaining portion is formed in at least one of the intake portion and the exhaust portion.

In addition, the present invention provides a pouch which is for use in the above-described cool box and which is set on the agent retaining portion of the above-described air circulator. The pouch has a bag-like body containing an analysis inhibitor removing agent for removing components (analysis inhibitor) adversely affecting or inhibiting analysis of analytes.

According to the present invention, the sealability of the cool box can be prevented from decreasing. At the same time, components adversely affecting analysis of analytes can be removed more efficiently than in the prior art.

DESCRIPTION OF THE INVENTION

Figure 1:
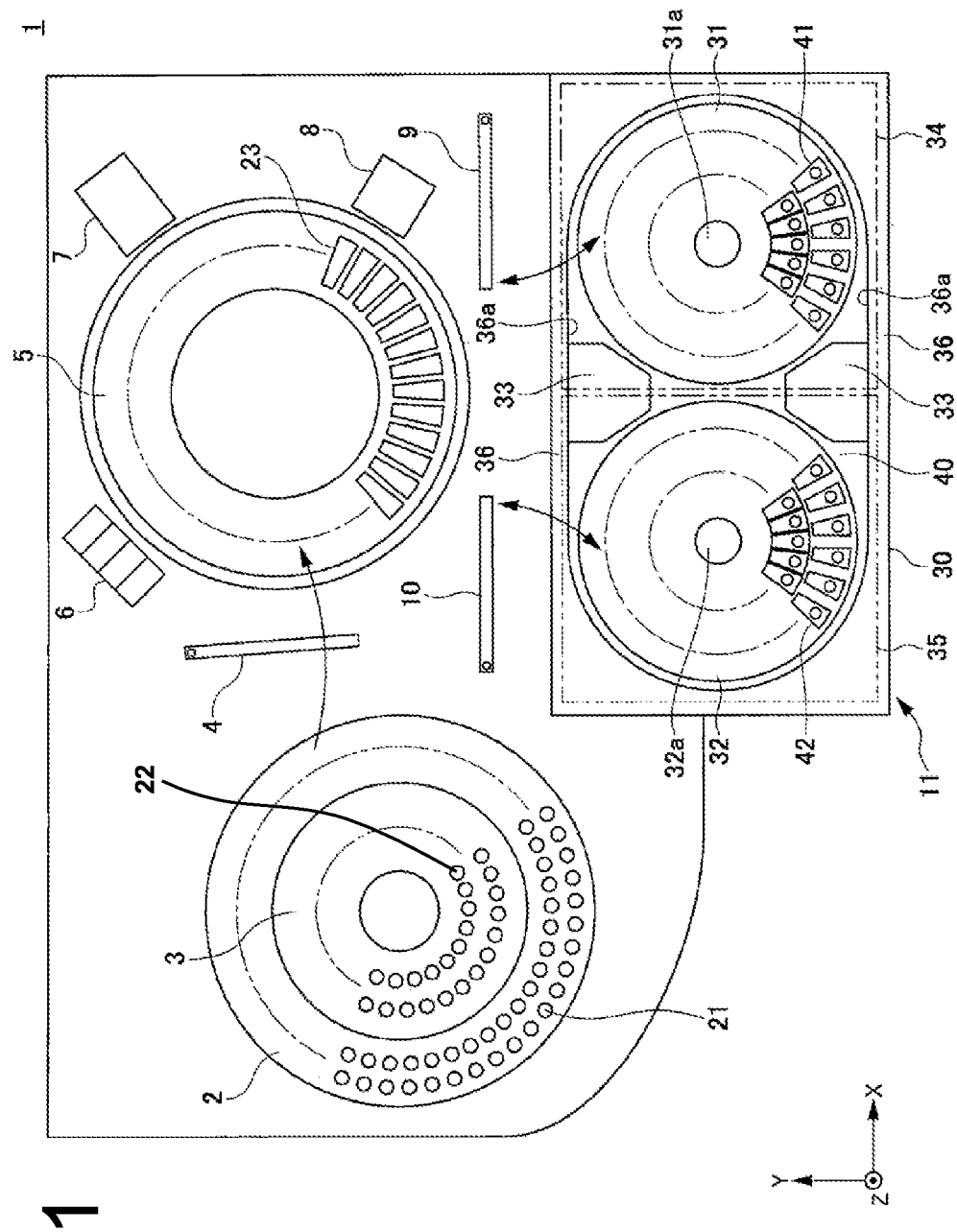
FIG. 1 is a schematic plan view showing the configuration of an automatic analyzer associated with a first embodiment of the present invention.

The preferred embodiments of the present invention are hereinafter described in detail with reference to the drawings. In the present specification and accompanying drawings, elements having substantially identical function or configuration are indicated by the same reference numerals and a repetition of the description thereof is omitted.

First Embodiment (Configuration of Automatic Analyzer)

FIG. 1 is a schematic plan view showing the configuration of an automatic analyzer associated with a first embodiment of the present invention. A biochemical analyzer is taken herein as one example of the automatic analyzer. The automatic analyzer associated with the present invention may also be applied to analyzers other than biochemical analyzers. A biochemical analyzer is an apparatus for analyzing biological components contained in analytes such as blood and urine. Furthermore, the automatic analyzer associated with the present invention may be applied to an analyzer which performs both biochemical analysis functions and electrolyte analysis functions.

The automatic analyzer shown in FIG. 1 is generally indicated by reference numeral 1, and is an apparatus for analyzing analytes. More specifically, the apparatus takes biological fluid components such as blood and urine as analytes, and measures various components such as sugar, cholesterol, proteins, and enzymes. The automatic analyzer 1 has a sample turntable 2, a cleaning turntable 3, a sample aliquoting unit 4, a reaction turntable 5, a cleaning unit 6, a first stirring unit 7, a second stirring unit 8, a first reagent aliquoting unit 9, a second reagent aliquoting unit 10, a reagent storage unit 11, and a multi-wavelength photometer (not shown).

The sample turntable 2 is shaped annularly as viewed from above and mounted to be rotatable circumferentially. The sample turntable 2 can accommodate a plurality of analyte receptacles 21. The analyte receptacles 21 are arranged circumferentially of the sample turntable 2 at a given spacing. Also, the analyte receptacles 21 are arranged as two rows which are spaced at a given spacing from each other radially of the sample turntable 2. Each of the analyte receptacles 21 is a container for receiving an analyte such as blood, urine, blood serum, or the like.

The cleaning turntable 3 is shaped annularly as viewed from above and can provide cold storage. The cleaning turntable 3 is mounted to be rotatable circumferentially in the same manner as the sample turntable 2. The cleaning turntable 3 is disposed concentrically relative to the sample turntable 2 on the inner side of the sample turntable 2.

The cleaning turntable 3 is configured to accommodate a plurality of liquid receptacles 22. The liquid receptacles 22 are arranged peripherally of the cleaning turntable 3 at a given spacing. The liquid receptacles 22 are arranged as two rows which are spaced a given spacing radially of the cleaning turntable 3. Each of the liquid receptacles 22 is a container for receiving a liquid such as a standard reagent used for calibration of the automatic analyzer 1.

The arrangement of the analyte receptacles 21 in the radial direction of the sample turntable 2 is not restricted to two rows. The arrangement may also be one row or three or more rows. This principle also applies to the plurality of liquid receptacles 22.

The sample aliquoting unit 4 is disposed between the sample turntable 2 and the reaction turntable 5. The sample aliquoting unit 4 draws in an analyte from a selected one of the analyte receptacles 21 set on the sample turntable 2 and delivers the sucked analyte into a selected one of reaction receptacles 23 set on the reaction turntable 5. The sample aliquoting unit 4 also delivers a diluent, supplied by a pump (not shown), into the reaction receptacle 23 in which the analyte has also been delivered. That is, the sample aliquoting unit 4 delivers an analyte and a diluent in turn into one reaction receptacle 23.

The reaction turntable 5 is supported to be capable of being rotated peripherally by a drive mechanism (not shown). The reaction turntable 5 is configured to be able to accommodate a plurality of reaction receptacles 23. The reaction receptacles 23 are arranged peripherally of the reaction turntable 5. An analyte is sampled from a selected one of the analyte receptacles 21 and diluted with the diluent. The diluted analyte, a first reagent sampled from a selected one of first reagent receptacles 41, and a second reagent sampled from a selected one of second reagent receptacles 42 are poured into the selected one of the reaction receptacles 23. In this reaction receptacle 23, the diluted analyte, first reagent, and second reagent are stirred together, thus inducing a reaction.

The cleaning unit 6 cleans the inside of the reaction receptacle 23 which has undergone a test. The cleaning unit 6 has a plurality of cleaning nozzles (not shown) which are connected to a liquid waste pump (not shown) and to a cleaning pump (not shown).

A process for cleaning the reaction receptacle 23 with the cleaning unit 6 is carried out by the following procedure.

First, the cleaning unit 6 inserts the cleaning nozzles into the reaction receptacle 23 and drives the liquid waste pump to thereby draw in the diluted analyte remaining in the reaction receptacle 23 by the cleaning nozzles. The diluted analyte drawn in by the cleaning nozzles is dispensed into a liquid waste tank (not shown) by the cleaning unit 6.

Then, the cleaning unit 6 drives a detergent pump to supply a detergent into the cleaning nozzles. The cleaning unit 6 also dispenses the supplied detergent into the reaction receptacle 23 from the cleaning nozzles. Consequently, the inside of the reaction receptacle 23 is cleaned. The cleaning unit 6 then sucks the detergent remaining in the reaction receptacle 23 by the cleaning nozzles. Thereafter, the cleaning unit 6 dries the inside of the reaction receptacle 23. Thus, the cleaning of the reaction receptacle 23 is completed.

The first stirring unit 7 has a stirring element (not shown). The stirring unit 7 inserts the stirring element into the reaction receptacle 23 to stir together the diluted analyte and the first reagent. This produces a quick and homogeneous reaction between the diluted analyte and the first reagent.

The second stirring unit 8 having a stirring element (not shown) inserts the stirring element into the reaction receptacle 23 to thereby stir together the diluted analyte, the first reagent, and the second reagent. This brings about a homogeneous and quick reaction among the diluted analyte, the first reagent, and the second reagent.

The first reagent aliquoting unit 9 is located between the reaction turntable 5 and a first reagent turntable 31. The first reagent aliquoting unit 9 aspirates the first reagent from the first reagent receptacle 41 set on the first reagent turntable 31 and dispenses the aspirated first reagent into the reaction receptacle 23 set on the reaction turntable 5.

The second reagent aliquoting unit 10 is positioned between the reaction turntable 5 and a second reagent turntable 32. The second reagent aliquoting unit 10 aspirates the second reagent from a selected one of the second reagent receptacles 42 set on the second reagent turntable 32 and dispenses the aspirated second reagent into a selected one of the reaction receptacles 23 set on the reaction turntable 5.

The reagent storage unit 11 is one example of a cool box and forms a part of the automatic analyzer 1. The reagent storage unit 11 comprises a storage unit body 30, the first reagent turntable 31, the second reagent turntable 32, a pair of air circulators 33, a first cover-like member 34, and a second cover-like member 35. In FIG. 1, there are shown three directions, i.e., X, Y, and Z directions, which are perpendicular to each other. In particular, the X and Y directions are parallel to the horizontal direction. The Z direction is parallel to the vertical direction. The X direction is equivalent to the longitudinal direction of the reagent storage unit 11. The Y direction is equivalent to the direction of the shorter dimension of the reagent storage unit 11. The Z direction is equivalent to the heightwise direction of the reagent storage unit 11. This principle also applies to other figures of the drawings.

The storage unit body 30 of the reagent storage unit is equivalent to the body of the cool box. The storage unit body 30 has a receiving space 40 whose top is open. The receiving space 40 is shaped based on a rectangle but whose two opposite sides are modified to be arc-shaped as viewed from above. This partially rounded rectangular shape is formed by combining two parallel straight line segments of equal length and two identical arc-shaped line segments. The receiving space 40 can accommodate the first reagent receptacles 41 and the second reagent receptacles 42. Each of the first reagent receptacles 41 receives the first reagent that is for use in analyte analysis. The first reagent receptacle 41 has an opening that is closed off by a cap (not shown). Each of the second reagent receptacles 42 receives the second reagent that is for use in analyte analysis. The second reagent receptacle 42 has an opening that is closed off by a cap (not shown). The first reagent receptacles 41 and the second reagent receptacles 42 are received in the receiving space 40 while their openings are open, i.e., with their caps removed.

The first reagent turntable 31 is located on one side of the reagent storage unit body 30 (on the right side in FIG. 1) as viewed in its longitudinal direction. The second reagent turntable 32 is located on the other side of the reagent storage unit body 30 (on the left side in FIG. 1) as viewed in its longitudinal direction. That is, the first reagent turntable 31 and the second reagent turntable 32 are arranged adjacent to each other longitudinally of the reagent storage unit body 30. The first reagent turntable 31 and the second reagent turntable 32 are placed in the receiving space 40 of the reagent storage unit body 30.

The first reagent turntable 31 is shaped annularly as viewed from above. The first reagent turntable 31 is rotationally driven by a rotational drive portion 31a and can be coupled to and decoupled from the rotational drive portion 31a. The first reagent turntable 31 has a rack capable of holding the individual first reagent receptacles 41 in their vertical posture, i.e., the openings of the first reagent receptacles 41 face upward. The second reagent receptacles 42 described later are constructed similarly. The first reagent receptacles 41 are arranged peripherally of the first reagent turntable 31 at a given spacing. The first reagent receptacles 41 are arranged in two rows which are spaced a given spacing radially of the first reagent turntable 31.

The second reagent turntable 32 is shaped annularly as viewed from above and rotationally driven by a rotational drive portion 32a and can be coupled to and decoupled from the rotational drive portion 32a. The second reagent turntable 32 has a rack capable of holding the individual second reagent receptacles 42 in their vertical posture. The second reagent receptacles 42 are arranged peripherally of the second reagent turntable 32 at a given spacing. The second reagent receptacles 42 are arranged in two rows which are spaced a given spacing radially of the second reagent turntable 32.

Figure 2:
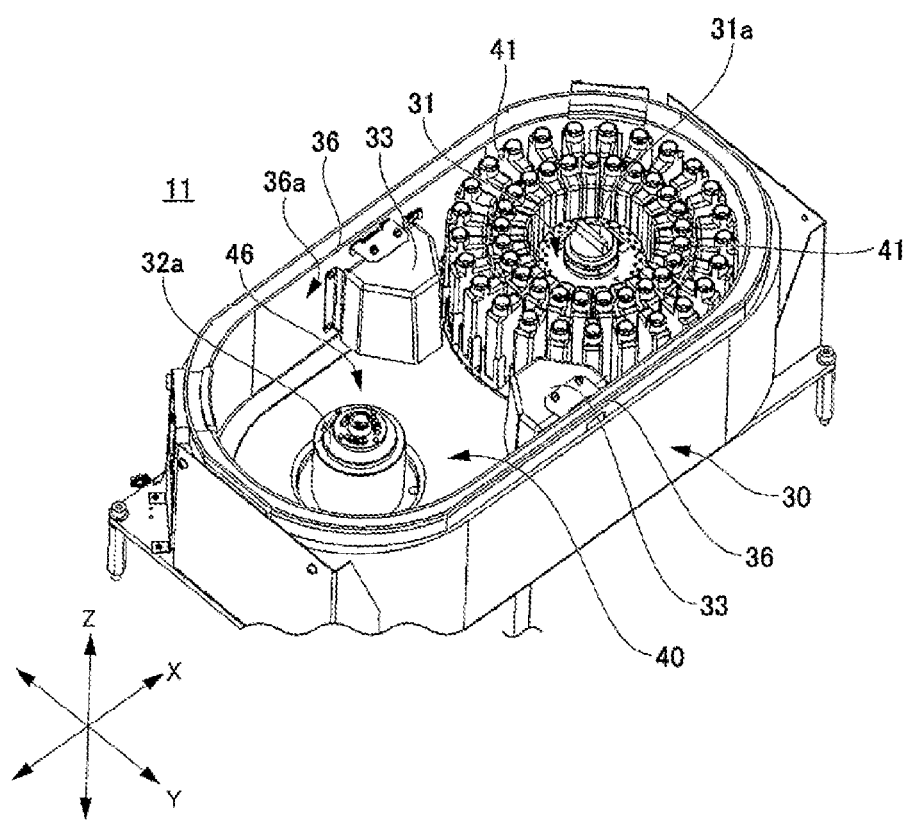
FIG. 2 is a perspective view showing the interior of a reagent storage unit shown in FIG. 1.

The pair of air circulators 33 is disposed inside the reagent storage unit 11. More specifically, the air circulators 33 of one pair are placed in the receiving space 40 of the storage unit body 30 of the reagent storage unit together with the aforementioned first reagent turntable 31 and second reagent turntable 32. The air circulators 33 are placed on the inner surfaces 36a of opposing sidewalls 36 of the reagent storage unit body 30 as also shown in FIG. 2. The air circulators 33 operate to circulate air in the receiving space 40. In other words, air in the receiving space 40 is either air inside the reagent storage unit 11 or air inside the reagent storage unit body 30. The configuration of the air circulators 33 will be described in detail later.

Figure 3:
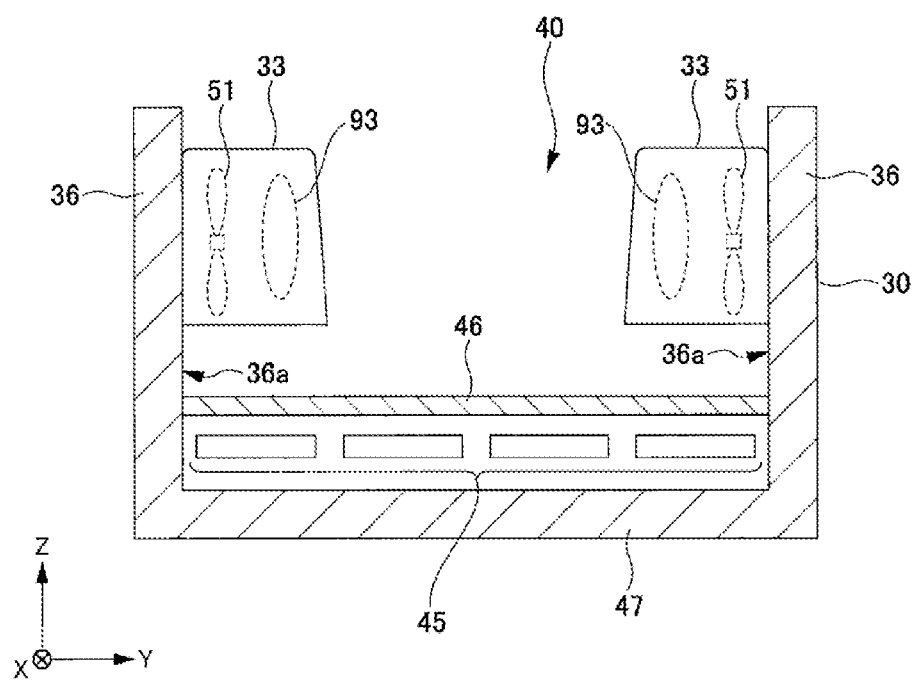
FIG. 3 is a schematic cross-sectional view showing the configuration of the reagent storage unit shown in FIG. 2.

As shown in FIG. 3, a cooling portion 45 is laid on the bottom of the reagent storage unit body 30. The cooling portion 45 cools the receiving space 40 by circulating a refrigerant such as cool water. A floor plate 46 is mounted to the bottom of the reagent storage unit body 30. The floor plate 46 cooperates with the sidewalls 36 of the reagent storage unit body 30 to form the receiving space 40. A gap is formed between the floor plate 46 and a bottom wall 47 of the reagent storage unit body 30. The cooling portion 45 is placed in this gap. The cooling portion 45 is placed in contact or in proximity with the floor plate 46. Therefore, the cooling portion 45 is designed to cool the receiving space 40 through the floor plate 46. In this case, the floor plate 46 is preferably made of a material of a high thermal conductivity.

The air in the receiving space 40 which has been cooled by the cooling portion 45 is circulated inside the receiving space 40 by the suction and discharge of air caused by the air circulators 33. Therefore, reagents received in the first reagent receptacles 41 and the second reagent receptacles 42 can be efficiently cooled by causing the first reagent receptacles 41 accommodating the first reagent and the second reagent receptacles 42 accommodating the second reagent to be received in the receiving space 40 together with the first reagent turntable 31 and the second reagent turntable 32.

The cooling portion 45 is not restricted to a structure that circulates refrigerant. For example, the cooling portion 45 may be configured including a Peltier device. That is, any configuration may be adopted as long as it can cool the receiving space 40.

The top opening of the reagent storage unit body 30 can be covered and uncovered by the first cover-like member 34 and the second cover-like member 35. The region of the receiving space 40 of the reagent storage unit body 30 in which the first reagent turntable 31 is received can be covered and uncovered by the first cover-like member 34. The region of the receiving space in which the second reagent turntable 32 is received can be covered and uncovered by the second cover-like member 35.

Figure 4:
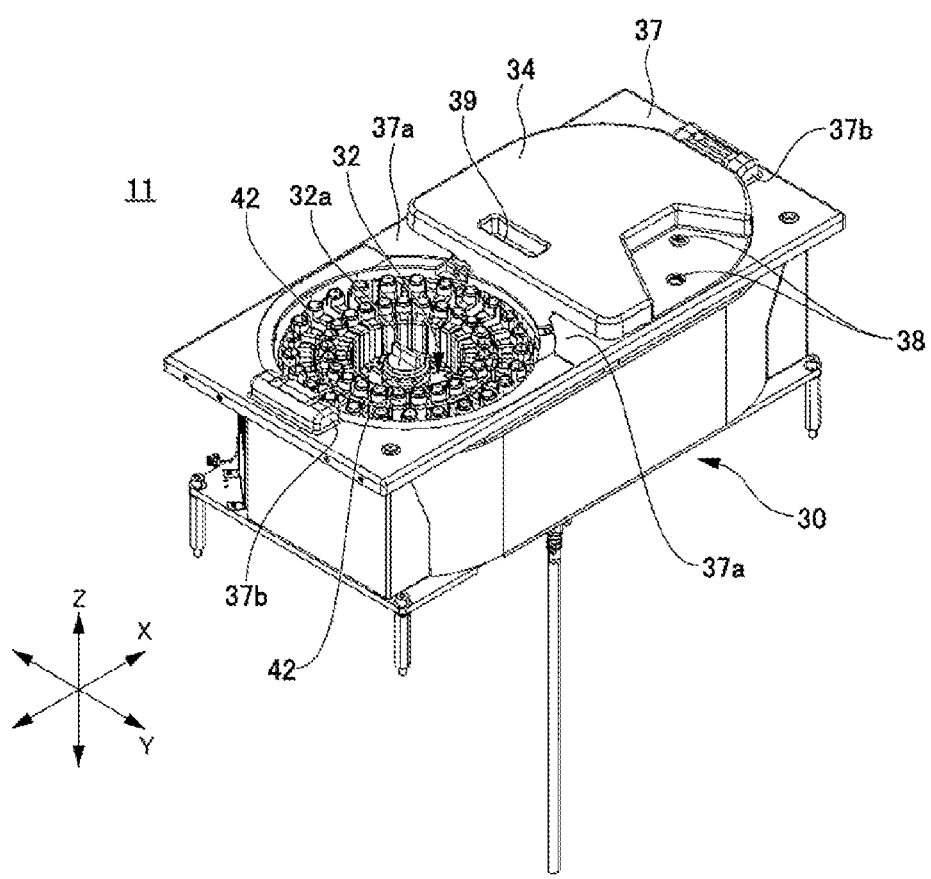
FIG. 4 is a perspective view showing the configuration of the reagent storage unit shown in FIGS. 2 and 3.

FIG. 4 is a perspective view illustrating the configuration of the cover-like members equipped in the reagent storage unit associated with the first embodiment of the present invention. In FIG. 4, the second cover-like member 35 is omitted. As shown in FIG. 4, the first cover-like member 34 is attached to a frame member 37 which is a member mounted over the reagent storage unit body 30. The frame member 37 has a pair of flared portions 37a and two hinge portions 37b.

The pair of flared portions 37a is formed on the frame member 37 in a corresponding manner to the pair of air circulators 33. The flared portions 37a are located just above the air circulators 33 while the frame member 37 is mounted to the reagent storage unit body 30. That is, the flared portions 37a extend out in the Y direction so as to provide a cover over the air circulators 33. The first cover-like member 34 is rotatably supported by one hinge portion 37b out of the two hinge portions 37b. The second cover-like member 35 is rotatably supported by the other hinge portion 37b. The first cover-like member 34 and the second cover-like member 35 can open and close about their respective pivot points, i.e., the hinge portions 37b.

The first cover-like member 34 is provided with two aliquoting holes 38 and a grip portion 39. One of the two aliquoting holes 38 is used to aliquot and dispense the first reagent in a selected one of the first reagent receptacles 41 arranged on the outer side on the first reagent turntable 31. The other aliquoting hole 38 is used to aliquot and dispense the first reagent in a selected one of the first reagent receptacles 41 arranged on the inner side on the first reagent turntable 31. Similarly, the second cover-like member 35 is provided with two aliquoting holes (not shown) in conformity with the arrangement of the second reagent receptacles 42 on the second reagent turntable 32. When the first cover-like member 34 is manipulated to open or close it, the worker grips the grip portion 39. The grip portion 39 is also mounted on the second cover-like member 35. When the first cover-like member 34 and the second cover-like member 35 are closed together, the top opening of the reagent storage unit body 30 is closed by the first cover-like member 34 and the second cover-like member 35. Consequently, the receiving space 40 of the reagent storage unit body 30 is closed off by the first cover-like member 34 and the second cover-like member 35 except for the aliquoting holes 38. The aliquoting holes 38 have an inside diameter much smaller than the diameter of the whole opening of the receiving space 40. Therefore, by closing the first cover-like member 34 and the second cover-like member 35, the inside of the reagent storage unit body 30 is substantially closed off to such an extent that it is not affected by the outside air.

The multi-wavelength photometer performs optical measurements of the diluted analyte which has been injected in the selected reaction receptacle 23 and which has reacted with the first and second reagents. The multi-wavelength photometer is used to detect how the diluted analyte has reacted, and outputs numerical data indicating the "absorbance" of the diluted analyte, or subject of detection (measurement). Since the numerical data about the absorbance represented by the output from the multi-wavelength photometer varies according to the amounts of various components of the analyte, the amounts of the components can be found from the numerical data.

(Configuration of Air Circulators)

Figure 5:
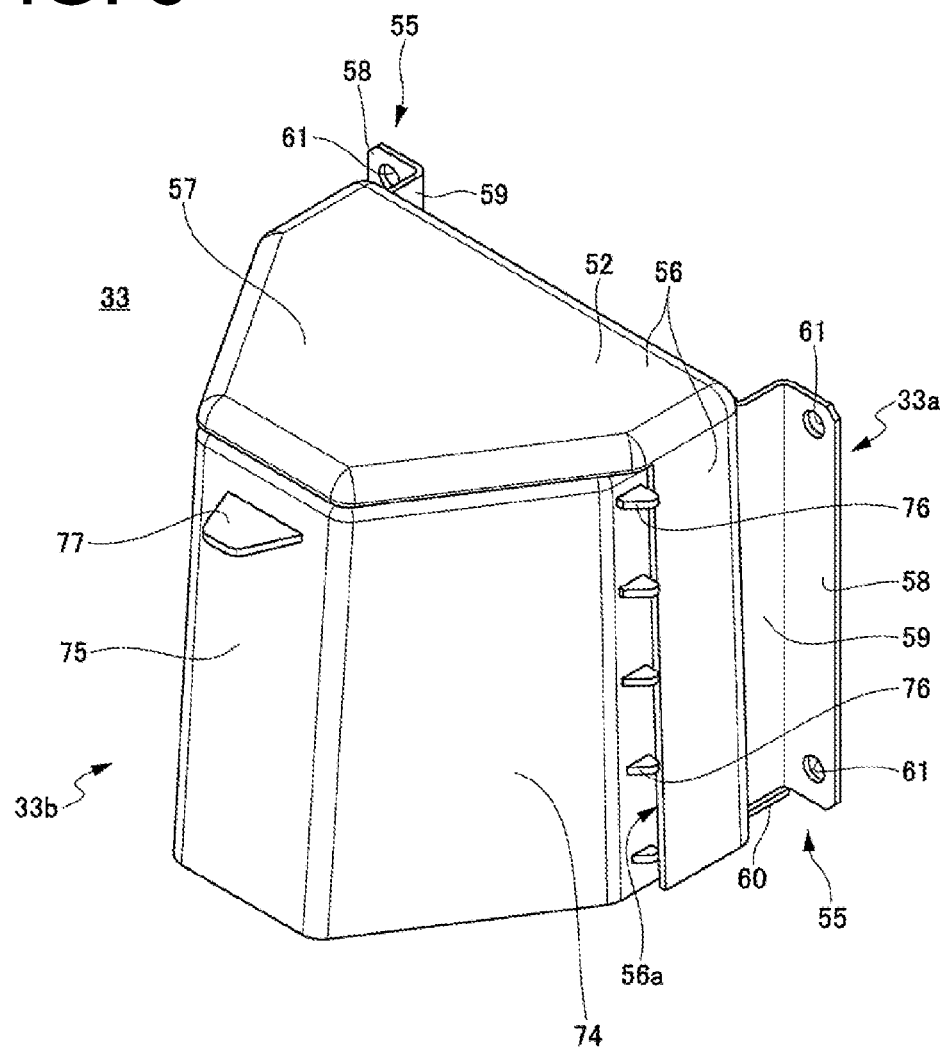
FIG. 5 is a perspective view showing the configuration of an air circulator equipped in the reagent storage unit shown in FIGS. 2-4.
Figure 6:
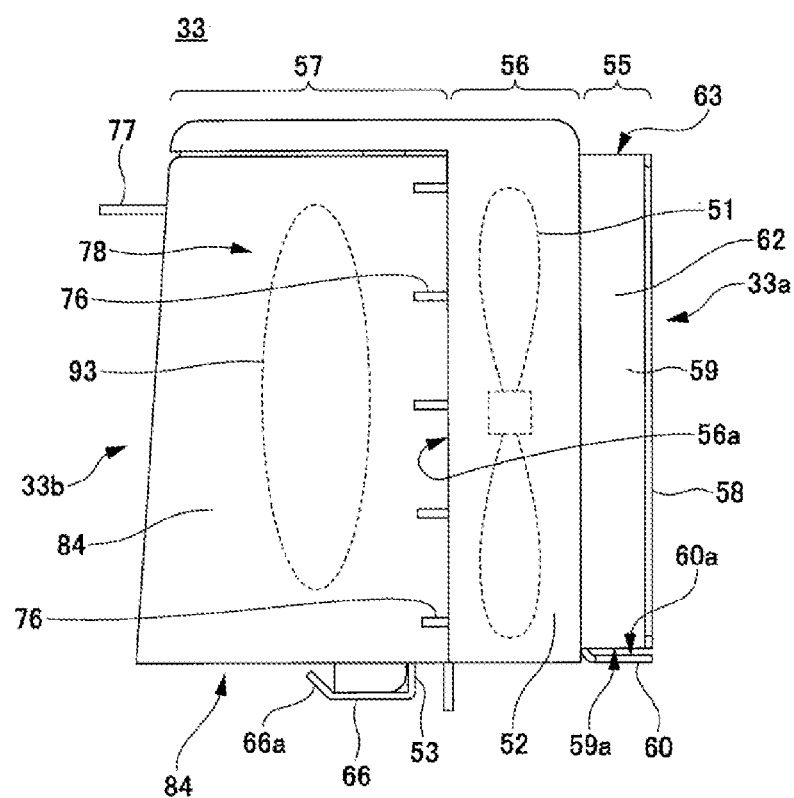
FIG. 6 is a side elevation of the air circulator shown in FIG. 5.
Figure 7:
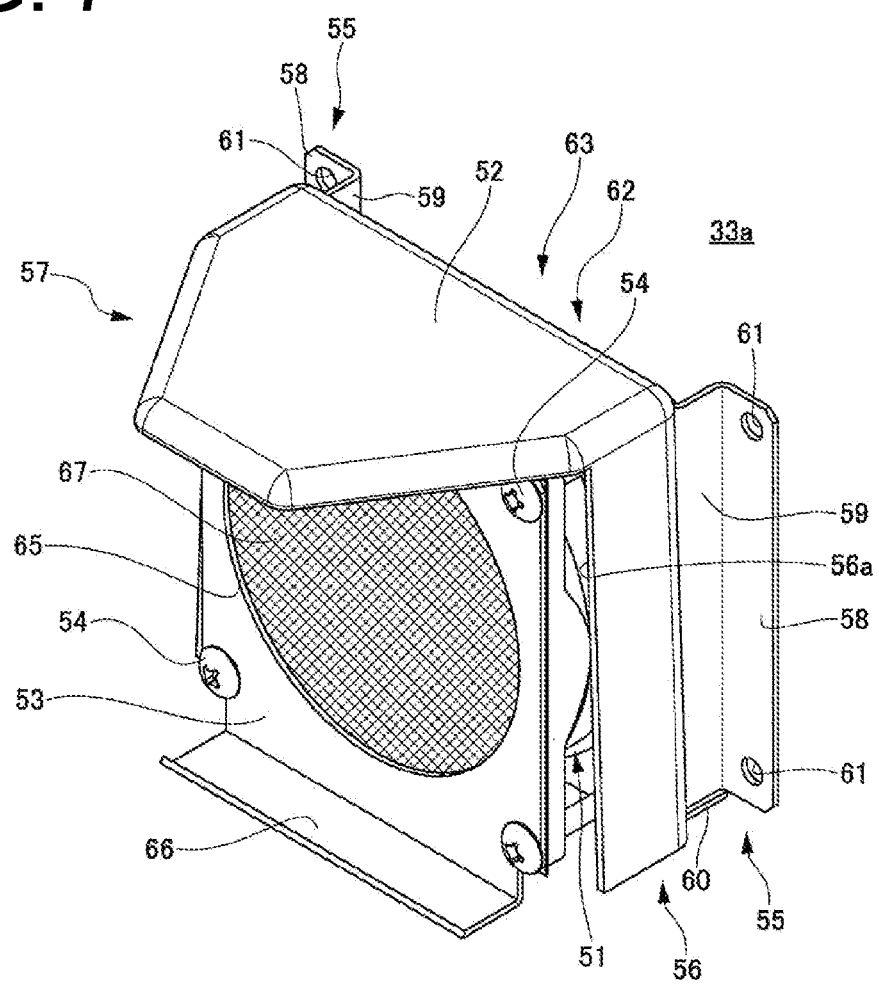
FIG. 7 is a perspective view of a first unit of the air circulator shown in FIGS. 5 and 6.
Figure 8:
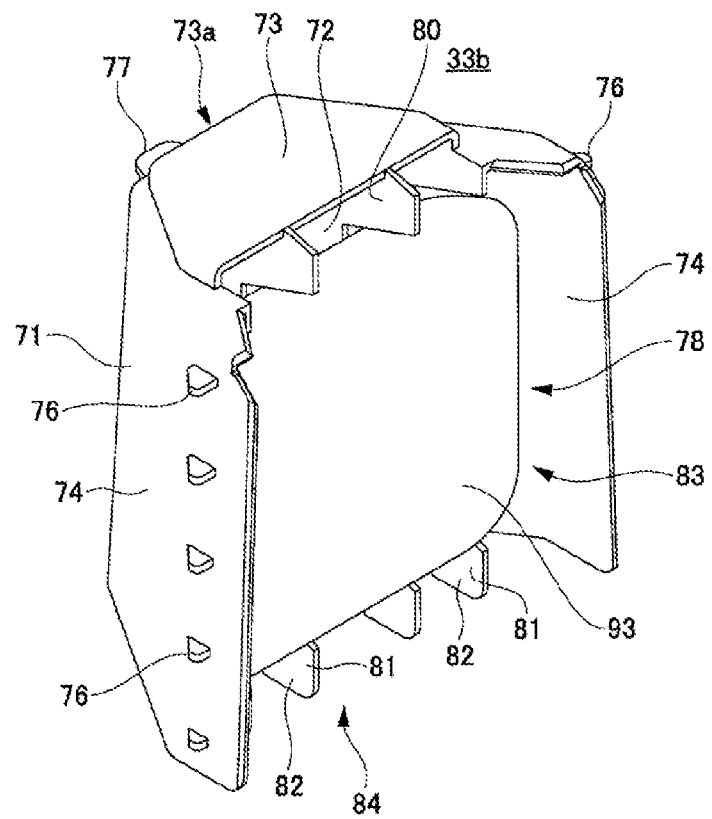
FIG. 8 is a perspective view of a second unit of the air circulator shown in FIGS. 5 and 6.

FIG. 5 is a perspective view of one of the air circulators equipped in the reagent storage unit associated with the first embodiment of the present invention. FIG. 6 is a side elevation of the air circulator of FIG. 5. FIG. 7 is a perspective view of a first unit of the air circulator shown in FIGS. 5 and 6. FIG. 8 is a perspective view of a second unit of the air circulator shown in FIGS. 5 and 6.

As shown in FIGS. 5-8, each air circulator 33 comprises a combination of the first unit 33a and the second unit 33b. The first unit 33a and the second unit 33b are detachably mounted together. These units 33a and 33b are described in turn below.

(First Unit 33a)

The first unit 33a has a fan 51, a first cover 52, and a support bracket 53.

(Fan 51)

The fan 51 is made of an axial fan, for example. As shown in FIG. 7, the fan 51 is mounted to the first cover 52 together with the support bracket 53 with plural screws 54. The first cover 52 and the support bracket 53 may be integral with or separate from each other. In the present first embodiment, it is assumed that the first cover 52 and the support bracket 53 are separate from each other. The fan used in the air circulator may be of any model or type as long as it has a function of aspirating air from one side and delivering the air to the other side, i.e., blowing function.

(First Cover 52)

The first cover 52 is secured to the sidewalls 36 of the reagent storage unit body 30. The first cover 52 covers a radially outer portion of the fan 51, the radial direction being perpendicular to the central axis of rotation of the fan 51. The first cover 52 has a pair of mounting portions 55, a fan cover portion 56, and a visor portion 57 which are fabricated integrally.

(Mounting Portions 55)

The mounting portions 55 are used to mount the air circulator 33 to the sidewalls 36 of the reagent storage unit body 30. The mounting portions 55 are arranged as a pair, left and right of the front of the circulator 33. Each mounting portion 55 has a mounting plate 58, a side plate 59, and a lower plate 60.

The mounting plate 58 is elongated in an up/down direction, i.e., elongated vertically. The mounting plate 58 is provided with two mounting holes 61 which are spaced from each other in the up/down direction. The mounting holes 61 extend thicknesswise through the mounting plate 58. Where the air circulator 33 is mounted to the sidewalls 36 of the reagent storage unit body 30, screws (not shown) are inserted into the mounting holes 61, respectively, and the screws are brought into engagement with threaded holes previously formed in the inner surfaces 36*a* of the sidewalls 36 and tightened. Consequently, the first cover 52 is securely fastened to the sidewalls 36 of the reagent storage unit body 30.

The side plate 59 is elongated vertically in the same manner as the mounting plate 58. The side plate 59 is bent at a right angle from the fringes of the mounting plate 58. The lower plate 60 is laid between the lower end of one side plate 59 and the lower end of the other side plate 59. The left and right side plates 59 and the intervening lower plate 60 together constitute an intake portion 62 of the air circulator 33. The intake portion 62 is located opposite to the fan 51 in the direction of the central axis of rotation of the fan 51. When the fan 51 is rotated, air is drawn into the intake portion 62. The intake portion 62 has an intake port 63 which is formed while the first cover 52 is mounted to the sidewalls 36 of the reagent storage unit body 30. Upon rotation of the fan 51, the air inside the receiving space 40 is sucked into the intake portion 62 through the intake port 63. The intake port 63 is placed above the depthwise midpoint of the receiving space 40, i.e., farther from the floor plate 46. The intake port 63 faces upward into the receiving space 40 of the reagent storage unit body 30 and draws in air from the upper layer in the receiving space 40. Preferably, the intake port 63 faces vertically upward. Alternatively, the port 63 may face obliquely upward.

In FIG. 6, a slight gap is formed between the lower end 59*a* of the side plate 59 and the top surface 60*a* of the lower plate 60. It does not matter whether this gap is present if the air stream formed by rotation of the fan 51 is not affected greatly thereby. That is, the lower end 59*a* of the side plate 59 and the top surface 60*a* of the lower plate 60 may be in intimate contact with each other.

(Fan Cover Portion 56 and Visor Portion 57)

The fan cover portion 56 is disposed around the fan 51. The visor portion 57 protrudes horizontally from the ceiling portion of the first cover 52. The visor portion 57 is shaped trapezoidally when the first cover 52 is viewed from above. The boundary between the fan cover portion 56 and the visor portion 57 serves as a base portion. The visor portion 57 has a protruding front end acting as a free end. The visor portion 57 can undergo flexural deformation in the up/down direction, i.e., has flexibility. An engagement portion (not shown) is formed on the lower surface side of the front end portion of the visor portion 57. When the second unit 33*b* is mounted to the first unit 33*a*, the engagement portion engages and anchors the second unit 33*b*. The engagement portion is shaped like a hook, for example.

(Support Bracket 53)

The support bracket 53 (see FIG. 7) is a cover that supports the first unit 33*a*. The support bracket 53 has an opening 65 and a receiver portion 66. The opening 65 is shaped circularly as viewed from the front of the support bracket 53. The opening 65 is located opposite to the fan 51 in the direction of the central axis of rotation of the fan 51. The opening 65 is positioned on the exhaust side of the fan 51. A mesh member 67 is mounted to the support bracket 53 so as to plug the opening 65. The mesh member 67 has a function of passing the air flow created by rotation of the fan 51. The mesh member 67 has another function of preventing a pouch 93 (see FIG. 10) described later from touching the fan 51. Furthermore, the mesh member 67 has a function of adjusting the rate of air flow created by the fan 51. In the present first embodiment, the mesh member 67 is attached to the support bracket 53. Alternatively, a part of the support bracket 53 which is opposite to the fan 51 may be provided with a plurality of holes such that the bracket 53 is punched or perforated.

The receiver portion 66 supports the first unit 33*a* from below. The receiver portion 66 is formed at the lower end of the support bracket 53. If the fan 51 is positioned on the rear side of the first unit 33*a* that is on the opposite side of the front side, the receiver portion 66 protrudes forwardly from the lower end of the support bracket 53. The receiver portion 66 has an extension end 66*a* (see FIG. 6) that is bent obliquely upwardly.

(Second Unit 33*b*)

The second unit 33*b* (see FIG. 8) has a second cover 71 and a plurality of rib members 72. The second unit 33*b* can be integrally molded in plastic, for example. Furthermore, the second unit 33*b* can be fabricated by fastening the rib members 72 to the inside of the second cover 71.

(Second Cover 71)

The second cover 71 can be detachably mounted to the first cover 52. The second cover 71 has a function of varying the direction of air flow to downward direction, the air flow being induced by rotation of the fan 51. The second cover 71 has a top plate portion 73, a pair of side cover portions 74, and a front cover portion 75 which are fabricated integrally. The top plate portion 73, side cover portions 74, and front cover portion 75 together constitute an exhaust portion 83 inside the second cover 71. The exhaust portion 83 is formed at a position opposite to the fan 51 via the mesh member 67 in the direction of the central axis of rotation of the fan 51. When the fan 51 is rotated, air is expelled from the exhaust portion 83. The exhaust portion 83 has an exhaust port 84. When the fan 51 is rotated, air expelled into the exhaust portion 83 is exhausted into the receiving space 40 of the reagent storage unit body 30 through the exhaust port 84. The exhaust port 84 is located below the depthwise midpoint of the receiving space 40, i.e., closer to the floor plate 46. Because the exhaust port 84 faces downward into the receiving space 40 of the reagent storage unit body 30, air is forced into the lower layer in the receiving space 40. Preferably, the exhaust port 84 faces vertically downward. Alternatively, the exhaust port 84 may face obliquely downward.

The top plate portion 73 is formed at the top of the second cover 71. The top plate portion 73 is shaped trapezoidally in the same manner as the visor portion 57 of the first cover 52 but somewhat smaller in size than the visor portion 57. The side cover portions 74 of one pair are placed left and right, respectively, of the front of the second cover 71. A plurality of protrusions 76 are formed on the outer surface of each side cover portion 74. The protrusions 76 are spaced apart at a given spacing in the up/down direction. When the second cover 71 is mounted to the first cover 52, the protrusions 76 abut against edge portions 56*a* (see FIGS. 6 and 7) of the fan cover portion 56. Consequently, the protrusions 76 act as stoppers. The front cover portion 75 is formed to connect together the pair of side cover portions 74. A knob portion 77 is formed on the outer surface of the front cover portion 75 and protrudes forwardly of the front cover portion 75. When the second unit 33*b* is mounted to the first unit 33*a* or when the second unit 33*b* is detached from the first unit 33*a*, the worker picks the knob portion 77 with his fingertips.

(Rib Members 72)

Figure 9:
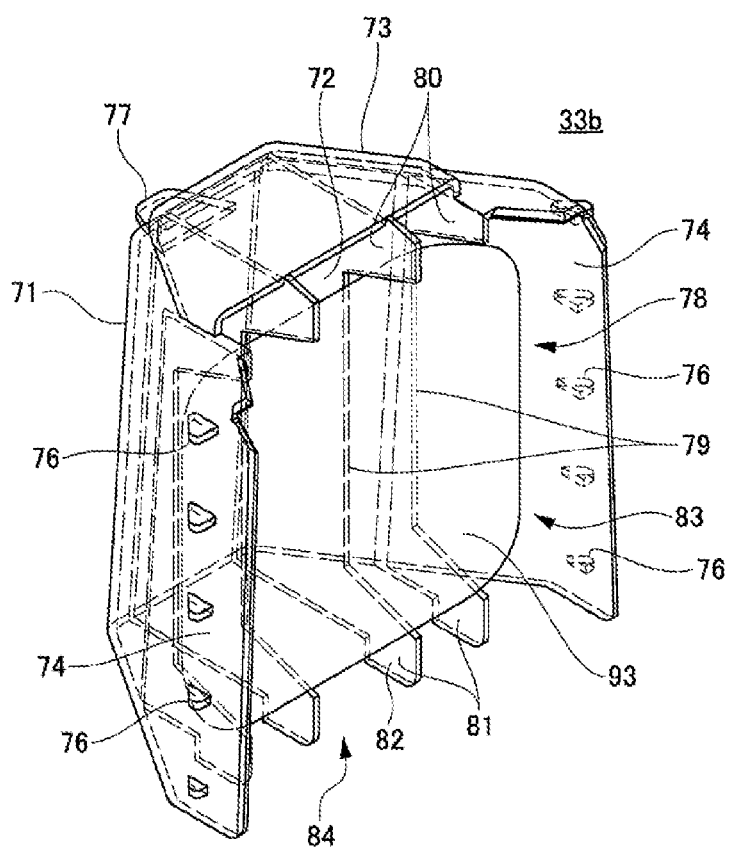
FIG. 9 is a perspective view of the interior of the second unit shown in FIG. 8.

The rib members 72 are disposed inside the second cover 71 so as to lie within the inner space of the exhaust portion 83. The rib members 72 form an inhibitor removing agent retaining portion 78 on which an analysis inhibitor removing agent is set, the agent acting to remove components adversely affecting or inhibiting analysis of analytes. The inhibitor removing agent will be described in detail later. As shown in FIGS. 8 and 9, each rib member 72 is formed like a flat plate and has recesses 79 that are formed by upper protruding portions 80 formed on top of the rib member 72 and lower protruding portions 81 formed near the bottom of the rib member 72. The plural rib members 72 are spaced from each other at a given spacing across the width of the second cover 71, i.e., in a left/right direction as the second cover 71 is viewed from the front. In the direction of arrangement of the rib members 72, the spaces between any two adjacent rib members 72 and the spaces between the rib members 72 disposed at the ends and the side cover portions 74 form air flow channels. Air flow induced by rotation of the fan 51 passes through these air flow channels and is expelled downwardly.

The aforementioned retaining portion 78 for the inhibitor removing agent is formed in the exhaust portion 83 by the rib members 72. In particular, the removing agent retaining portion 78 is formed into the exhaust portion 83 by arranging the recesses 79 of the rib members 72 according to the arrangement of the rib members 72. The agent retaining portion 78 is placed upstream of the exhaust port 84 in the passage of air flowing inside the air circulators 33. Loaded portions 82 are formed on the lower protruding portions 81. When the second unit 33b is mounted on the first unit 33a, the loaded portions 82 are loaded on the receiver portion 66. The loaded portions 82 are formed by downwardly protruding parts of the lower protruding portions 81.

(Inhibitor Removing Agent and Analysis Inhibitor (Analysis Hindering Components))

The removing agent removes components which are present within air and which hinder or inhibit analysis, for example, by adsorption or decomposition. The type or material of the removing agent may be selected according to the analysis hindering components (analysis inhibitor) to be removed. The analysis hindering components have the possibility of deteriorating the accuracy of measurement values obtained as the results of analysis of analytes. More specifically, the hindering components may deteriorate or modify liquids such as analytes or reagents. Various components can be such analysis hindering components. For example, where reagent components evaporating from one reagent receptacle deteriorate a reagent contained in other reagent receptacle, the evaporating reagent components are analysis hindering components. Where a reagent that reacts with oxygen and becomes deteriorated is handled, oxygen is an analysis hindering component or substance. Furthermore, where a reagent that reacts with moisture in air and becomes deteriorated is handled, moisture is an analysis hindering component or substance. In addition, where a reagent for use in analysis or measurement of ammonia contained in an analyte is handled, if ammonia in air dissolves into the reagent, then it may be impossible to obtain accurate analysis results. In this case, ammonia present in air is an analysis hindering component or substance. In some cases, there may be plural analysis hindering components or substances. The component removed by the removing agent may not be limited to one type; plural components may be removed. Further, plural removing agents may be combined. Examples of the removing agent include activated carbon, silica gel, zeolite, and activated alumina. The removing agent may be in the form of cotton, fibers, particles, and so on and can let air through. Fibrous removing agents and cottony removing agents have advantages of being lightweight, having high air permeability, not easily getting out of position if contained in a bag or pouch, being capable of retaining the shape of the bag easily, and allowing easy handling.

When a cottony or fibrous removing agent is put in a bag or pouch, fibers of the material become entangled, resulting in gaps. Air can be passed utilizing these gaps. When a particulate removing agent is put in a bag, gaps are formed among the individual particles. Air can be passed utilizing these gaps. The particulate removing agent may be made of a porous material.

Figure 10:
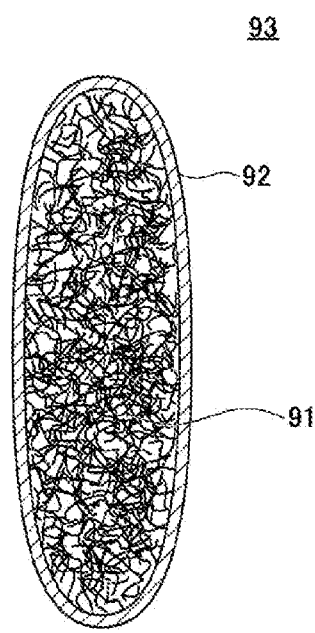
FIG. 10 is a schematic cross-sectional view showing the configuration of a pouch associated with the first embodiment of the present invention.

In the first embodiment of the present invention, as shown in FIG. 10, an inhibitor removing agent 91 in cotton form is put in the bag-like body 92 of the pouch 93. The pouch 93 has appropriate thickness and is shaped substantially elliptically as viewed from the front. The shape of the pouch 93 is not restricted to such a form. Rather, the shape may be modified at will according to the shape of the agent retaining portion 78. With respect to the cottony inhibitor removing agent 91, air is contained among the cotton fibers of the material and the agent swells. Consequently, the whole agent is soft and flexible. When the cottony removing agent 91 is put in the bag-like body 92, the bag-like body 92 easily expands and contracts while its shape is retained. For this reason, the cottony removing agent is especially easily handled. The bag-like body 92 is made of a breathing material, preferably but not necessarily unwoven cloth. Alternatively, the bag-like body 92 may be made of a resinous bag (such as vinyl bag) having a multiplicity of breathing holes or of a meshy bag. Where a member capable of accommodating the inhibitor removing agent 91 in place of the bag-like body 92 such as a meshy case member (not shown) is mounted on the removing agent retaining portion 78 of the air circulator 33, the removing agent 91 may be directly set in the case member of the agent retaining portion 78 without putting the removing agent 91 into the bag-like body 92.

The aforementioned pouch 93 is received and retained in the agent retaining portion 78 as shown in FIGS. 8 and 9. When the pouch 93 is received in the agent retaining portion 78, the pouch 93 is forced in between the upper protruding portions 80 and the lower protruding portions 81 inside the pair of side cover portions 74 by utilizing the flexibility of the pouch 93 itself. Consequently, the pouch 93 is received and held in the recesses 79 of the rib members 72. Therefore, where the pouch 93 is to be set on the agent retaining portion 78, the pouch 93 can be set in position without performing a securing operation such as screw clamping or bonding. When the pouch 93 is taken out of the agent retaining portion 78, the operation can be carried out without removing screws or adhesive. Accordingly, where the pouch 93 is treated as a consumable in the automatic analyzer 1, the work for exchanging the pouch 93 can be finished in a short time.

When the air circulator 33 is mounted to the reagent storage unit body 30, the following procedure is followed. First, the worker attaches the first unit 33a to the sidewalls 36 of the reagent storage unit body 30. At this time, the worker aligns the threaded holes (not shown) formed in the inner surfaces 36a of the sidewalls 36 with the mounting holes 61 formed in the pair of mounting plates 58. The worker inserts screws (not shown) into the mounting holes 61 while pressing the mounting plates 48 against the inner surfaces 36a of the sidewalls 36. The screws are brought into engagement with the threaded holes and tightened. Consequently, the first unit 33a can be secured to the sidewalls 36 of the reagent storage unit body unit 30. At this time, the intake portion 62 is formed on the back side of the first unit 33a (i.e., on the opposite sides of the inner surfaces 36a of the sidewalls 36) while surrounded by the pair of side plates 59, the lower plate 60, and the inner surfaces 36a of the sidewalls 36. The intake port 63 of the intake portion 62 is disposed to face the receiving space 40 such that air can be directly aspirated from the receiving space 40. The intake port 63 of the intake portion 62 faces upward into the receiving space 40.

Figure 11:
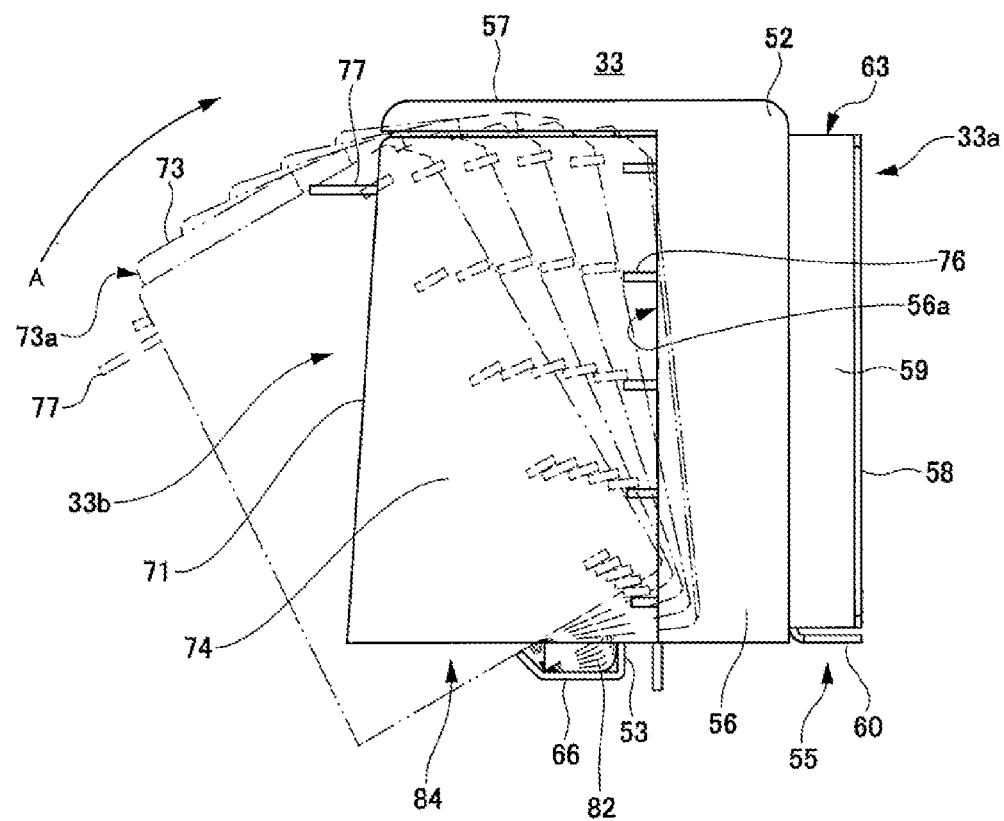
FIG. 11 is a schematic side elevation showing the manner in which the second unit is mounted to and detached from the first unit.
Figure 12:
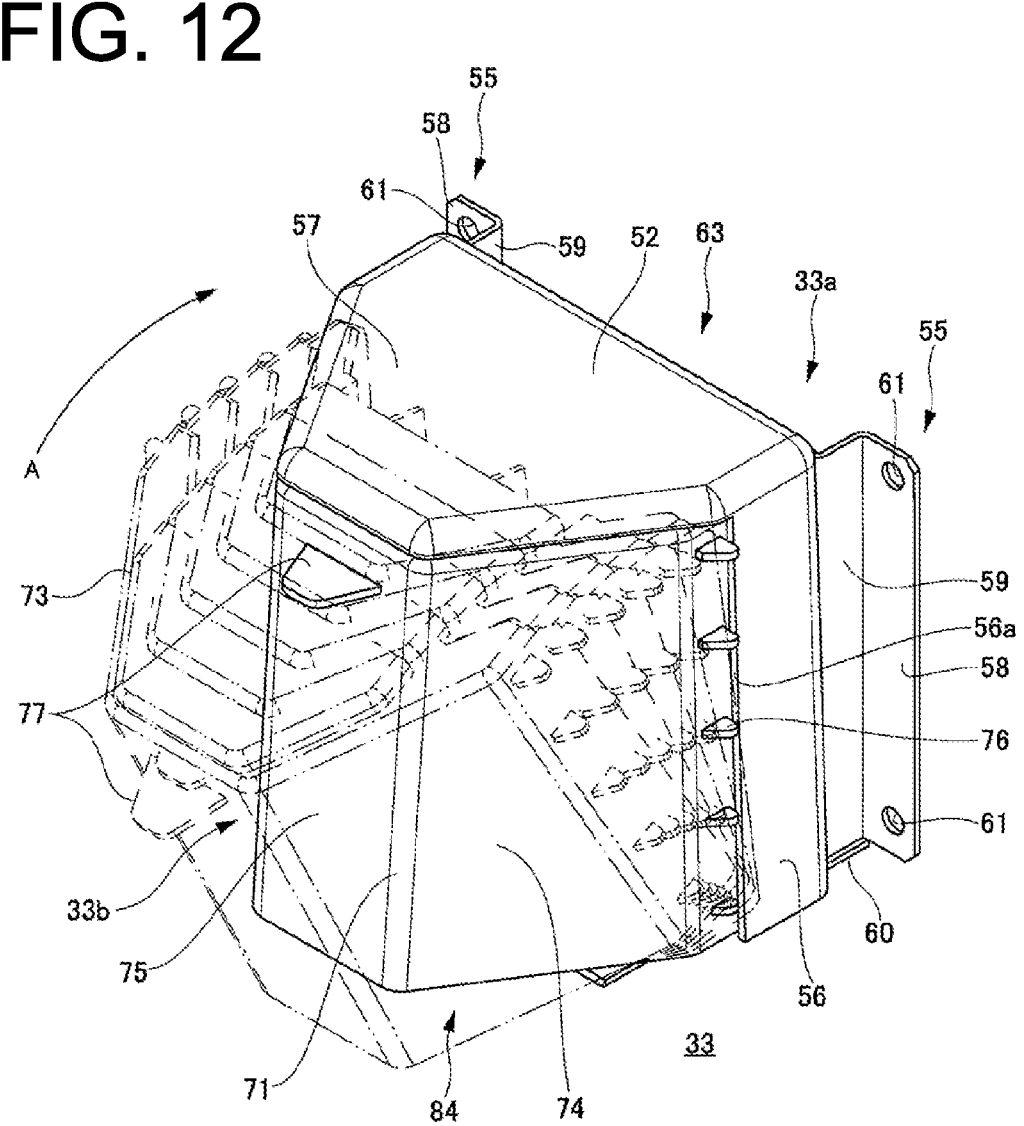
FIG. 12 is a perspective view showing the manner in which the second unit is mounted to and detached from the first unit.

Then, as shown in FIGS. 11 and 12, the worker places the loaded portions 82 of the rib members 72 on the receiver portion 66 of the support bracket 53 while tilting the second unit 33b relative to the first unit 33a. The worker then upwardly pushes the second unit 33b in the A direction to reduce the tilt of the second unit 33b relative to the first unit 33a. The top surface of the top plate portion 73 of the second cover 71 comes into contact with the bottom surface of the visor portion 57 of the first cover 52 while the second unit 33b is being pushed up. Under this condition, if the second unit 33b is further pushed up in the A direction, the front end of the visor portion 57 is pushed by the top plate portion 73 and undergoes upward flexure. When the second unit 33b is raised vertically without tilt, the flexure of the visor portion 57 is relieved, and the top plate portion 73 fits into the bottom side of the visor portion 57. At this time, the engagement portion (not shown) formed on the bottom surface of the visor portion 57 engages the edge portions 73a (see FIGS. 8 and 11) of the top plate portion 73 and become anchored. The plural protrusions 76 formed on the side cover portion 74 of the second cover 71 are made to strike the edge portions 56a of the fan cover portion 56. At this time, the exhaust portion 83 (see FIG. 8) of the second unit 33b is placed opposite to the fan 51 via the mesh member 67 (see FIG. 7). The exhaust port 84 of the exhaust portion 83 is placed to face the receiving space 40 such that air can be directly expelled into the receiving space 40. The exhaust port 84 of the exhaust portion 83 faces downward into the receiving space 40.

The air circulator 33 can be mounted in the reagent storage unit body 30 by the procedure described thus far. The pouch 93 can be placed inside the air circulator 33 as shown in FIG. 6 by setting the pouch 93 on the removing agent retaining portion 78 of the second unit 33b before the second unit 33b is mounted to the first unit 33a.

The receiving space 40 of the reagent storage unit body 30 is substantially closed off by placing the air circulator 33 inside the reagent storage unit body 30 and closing the first cover-like member 34 and the second cover-like member 35 in this way. Under this condition, if the fan 51 in the air circulator 33 is rotated, air inside the receiving space 40 is circulated by the suction and discharge of air caused by the fan 51. By cooling the air inside the receiving space 40 by means of the cooling portion 45 mounted below the floor plate 46, the cooled air is circulated inside the receiving space 40. Thus, the temperature of the inside of the reagent storage unit 11 can be kept low.

On the intake side of the fan 51 in the air circulator 33, air in the upper layer within the receiving space 40 is aspirated into the intake portion 62 from the intake port 63. In the present embodiment, the aliquoting holes 38 in the first cover-like member 34 and aliquoting holes (not shown) formed in the second cover-like member 35 are formed to face the air flow going into the intake port 62 of the air circulator 33. Therefore, if air flowing from the aliquoting holes 38 into the receiving space 40 contains analysis hindering components, the hindering components are immediately drawn into the intake portion 62 without diffusing into the receiving space 40. On the other hand, on the exhaust side of the fan 51 in the air circulator 33, air flow induced by the fan 51 passes through the mesh member 67 and is exhausted into the exhaust portion 83 and thence into the lower layer in the receiving space 40 through the exhaust port 84. In this way, the intake portion 62 of the air circulator 33 aspirates air in the upper layer of the receiving space 40 from the intake port 63. The exhaust portion 83 of the air circulator 33 expels air into the lower layer in the receiving space 40 from the exhaust port 84.

Thus, if a reagent or reagents contained in any one or ones of the first reagent receptacles 41 and the second reagent receptacles 42 have volatility, and if reagent components that can become analysis hindering components evaporate from the reagent receptacles, the hindering components can be drawn into the intake portion 62 from the intake port 63 together with the air in the upper layer of the receiving space 40. Air flow inside the air circulator 33 as described later makes it possible to remove the hindering components with the removing agent 91. Similarly, analysis hindering components contained in air flow going into the receiving space 40 from the aliquoting holes 38 can be removed. Consequently, air exhausted into the receiving space 40 from the air circulators 33 is free from the analysis hindering components and thus is clean. Furthermore, the air circulator 33 is designed to exhaust air into the lower layer in the receiving space 40 and so the air flow in the upper layer of the receiving space 40 is less disturbed than in the technique set forth in JP-A-2011-117802 where the blade members are rotated in the upper layer of the receiving space. This can suppress entry of the reagent components evaporating from reagent receptacles into other reagent receptacles. In addition, the air circulator 33 has the intake port 63 that faces upward and, therefore, reagent components evaporating from reagent receptacles can be forced into the intake port 63 together with the air flow in the upper layer of the receiving space 40.

The exhaust portion 83 of the air circulator 33 exhausts air toward the cooling portion 45 disposed below the floor plate 46. Consequently, clean air can be blown against the top surface of the floor plate 46 on which dew condensation would otherwise tend to occur because of the presence of the cooling portion 45. Hence, dew condensation can be prevented. Also, generation of microorganisms due to dew condensation is suppressed and thus air inside the receiving space 40 can be kept clean. Furthermore, short circuiting of air flow can be suppressed by placing the intake port 63 so as to face upward and by placing the exhaust port 84 so as to face downward as described previously. The short circuiting of air flow referred to herein is a phenomenon in which air flow exhausted from the air circulator 33 is directly sucked into the air circulator 33.

Furthermore, in the first embodiment of the present invention, the exhaust portion 83 has the removing agent retaining portion 78, and the pouch 93 is set on the agent retaining portion 78. Therefore, air flow passing through the mesh member 67 goes into the pouch 93, i.e., into the inhibitor removing agent 91 put in the bag-like body 92. Accordingly, if air flow sucked into the intake portion 62 due to rotation of the fan 51 contains analysis hindering components, the hindering components enter into the inhibitor removing agent 91 together with the air flow. The analysis hindering components contained in air rush into the pouch 93 while receiving wind pressure produced by rotation of the fan 51. This assures that the analyte hindering components (analysis inhibitor) are accepted into the bag-like body 92 containing the inhibitor removing agent 91 and become removed.

Furthermore, in the first embodiment of the present invention, the second unit 33*b* can be detachably attached to the first unit 33*a*. Therefore, if the pouch 93 needs to be replaced, for example, due to deterioration of the performance of the inhibitor removing agent 91, the replacement of the pouch 93 can be done quickly.

A work to exchange the pouch 93 consists of the following steps (1)-(8) which are carried out, for example, in the following sequence:

(1) The first cover-like member 34 and the second cover-like member 35 are opened.
(2) The first reagent turntable 31 and the second reagent turntable 32 are taken out of the reagent storage unit body 30.
(3) The second unit 33*b* is taken out of the first unit 33*a*.
(4) The pouch 93 that was already used is taken out of the removing agent retaining portion 78 of the second unit 33*b*.
(5) An unused pouch 93 is set on the removing agent retaining portion 78 of the second unit 33*b*.
(6) The second unit 33*b* is mounted to the first unit 33*a*.
(7) The first reagent turntable 31 and the second reagent turntable 32 are mounted in the reagent storage unit body 30.
(8) The first cover-like member 34 and the second cover-like member 35 are closed.

Where the second unit 33*b* can be attached to and detached from the first unit 33*a* without removing the first reagent turntable 31 and the second reagent turntable 32 from the reagent storage unit body 30, the steps (2) and (7) above can be dispensed with. Where the second unit 33*b* is taken out of the first unit 33*a*, the knob portion 77 of FIG. 11 is pinched and the second unit 33*b* is pulled in in a direction opposite to the A direction. This disengages the top plate portion 73 from the visor portion 57. Under this condition, the second unit 33*b* is raised obliquely, so that the second unit 33*b* can be taken out of the first unit 33*a*.

As described so far, in the first embodiment of the present invention, the exhaust portion 83 of the air circulator 33 for circulating air in the receiving space 40 has the removing agent retaining portion 78 on which the pouch 93 containing the analysis inhibitor removing agent 91 is set. Consequently, if air flow sucked into the intake portion 62 due to rotation of the fan 51 contains analysis hindering components i.e., analysis inhibitor, the hindering components flow into the inhibitor removing agent 91 together with the air flow. Hence, the hindering components can be efficiently removed by the removing agent 91. Furthermore, in the first embodiment of the present invention, when air flow in the receiving space 40 passes through the air circulator 33, the analysis inhibitor (analysis hindering components) is removed by the removing agent 91 and so air flow going out of the exhaust portion 83 of the air circulator 33 is free from the analysis hindering components and thus is clean. For this reason, the air inside the receiving space 40 can be kept clean if ventilation holes for placing the inside and outside of the reagent storage unit body 30 into communication with each other are not formed in the sidewalls 36 of the reagent storage unit body 30. In the first embodiment of the present invention, therefore, decrease in the sealability of the reagent storage unit 11 can be suppressed. At the same time, analysis hindering components adversely affecting analysis of analytes can be removed with higher accuracy.

Furthermore, in the first embodiment of the present invention, the receiving space 40 is closed off except for the aliquoting holes 38 by closing the top opening of the reagent storage unit body 30 with the first cover-like member 34 and the second cover-like member 35. This can suppress entry of outside air flow into the receiving space 40 from the outside of the reagent storage unit body 30. Consequently, air circulating in the receiving space 40 is hardly affected by outside air and can be kept clean. Hence, the performance of the inhibitor removing agent 91 can be maintained well for a long period of time. This can reduce the frequency at which the pouch 93 is replaced.

In addition, in the first embodiment of the present invention, the second cover 71 is detachably mounted to the first cover 52. The second cover 71 is provided with the removing agent retaining portion 78 on which the inhibitor removing agent 91 is set. This facilitates replacing the removing agent 91.

Additionally, in the first embodiment of the present invention, the inhibitor removing agent 91 is put into the bag-like body 92 to constitute the pouch 93. Inside the second cover 71, the pouch 93 is received and retained in the recesses 79 formed in the rib members 72 and so the removing agent 91 can be replaced on a pouch (93) basis. Consequently, the removing agent 91 can be replaced with ease. In the first embodiment of the present invention, one pouch 93 is set in one air circulator 33. Alternatively, a plurality of pouches 93 may be set in one air circulator 33.

Further, in the first embodiment of the present invention, the air circulators 33 of one pair are disposed on the inner surfaces of the opposing sidewalls 36 of the first reagent turntable 31. Therefore, air flows exhausted from the exhaust portions 83 of the air circulators 33 collide against each other at the widthwise midpoint of the reagent storage unit 11 with concomitant diffusion of air. The air is diffused throughout the whole receiving space 40. Accordingly, air from which the analysis hindering components have been removed with the removing agent 91, i.e., clean air, can be spread over the whole receiving space 40. Consequently, if first reagent storage unit and second reagent storage unit are built using a single wide receiving space 40, the receiving space 40 can be kept clean.

The removing agent retaining portion 78 may be formed in the intake portion 62 of each air circulator 33. Furthermore, the intake portion 62 and the exhaust portion 83 of each air circulator 33 may be both provided with their respective removing agent retaining portions.

Second Embodiment

Figure 13:
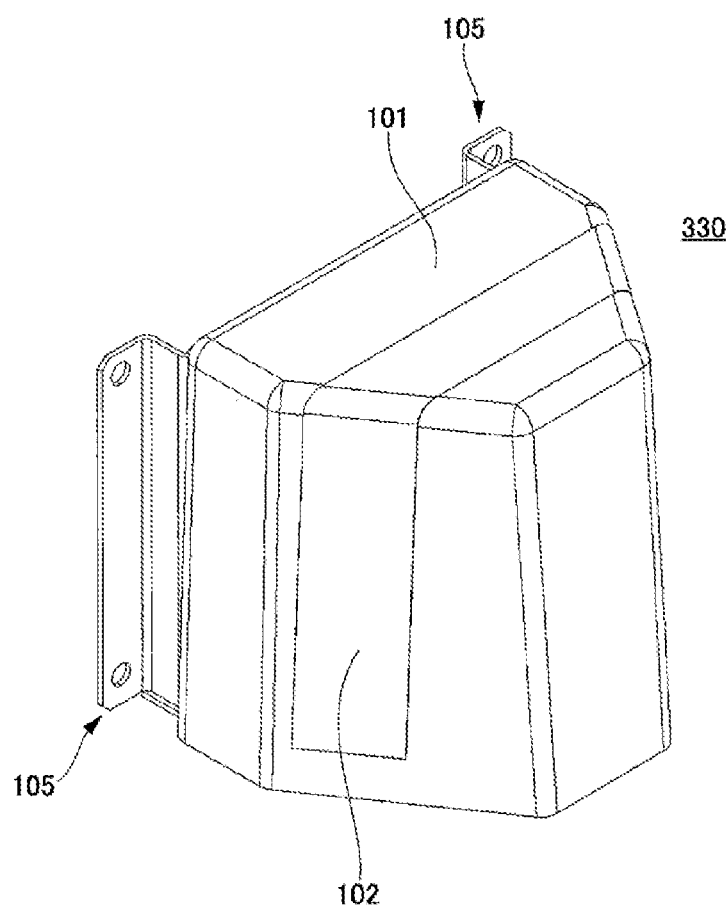
FIG. 13 is a perspective view showing the configuration of an air circulator equipped in a reagent storage unit associated with a second embodiment of the present invention.
Figure 14:
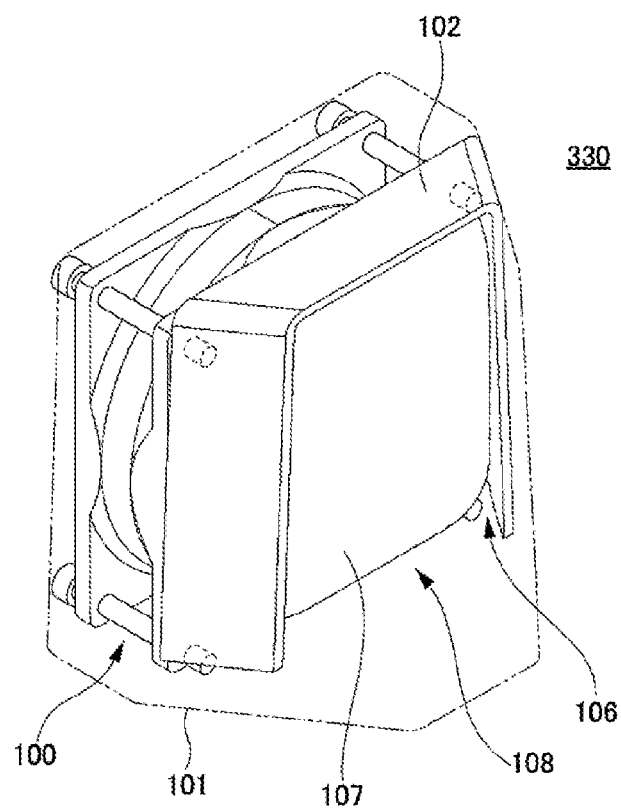
FIG. 14 is a perspective view illustrating the internal structure of the air circulator shown in FIG. 13.

A second embodiment of the present invention is next described. FIG. 13 is a perspective view of one of air circulators equipped in a reagent storage unit associated with the second embodiment of the invention, showing the configuration of the circulator. FIG. 14 is a perspective view illustrating the internal structure of the air circulator shown in FIG. 13. The reagent storage unit associated with the second embodiment is similar in configuration to that associated with the first embodiment except for the air circulators.

As shown in FIGS. 13 and 14, one air circulator is indicated by reference numeral 330 and has a fan 100, a first cover 101, and a second cover 102. The air circulator 330 is similar in general shape to the air circulators 33 of the first embodiment. The air circulator 330 is also similar to the air circulators 33 of the first embodiment in that it has an intake portion provided with an intake port opening upward and an exhaust portion provided with an exhaust port opening downward.

The fan 100 is made of an axial fan, for example. The fan 100 is mounted to the first cover 101 with plural screws (not shown).

The first cover 101 is secured to the sidewalls 36 of the reagent storage unit body 30. Therefore, the first cover 101 has mounting portions 105 similar in structure to the aforementioned mounting portions 55. The first cover 101 covers the fan 100 radially outwardly.

The second cover 102 can be attached to and detached from the first cover 101. The second cover 102 is shaped in the form of a gate when viewed from the front side. The outer surface of the second cover 102 is placed in flush with the outer surface of the first cover 101. A removing agent retaining portion 106 is formed on the inner side of the second cover 102. The pouch 107 is set on the agent retaining portion 106. The agent retaining portion 106 is formed in an exhaust portion 108 inside the air circulator 330. The pouch 107 is constructed by putting a removing agent in a bag-like body in the same manner as the pouch 93 (see FIG. 10) in the first embodiment.

Figure 15:
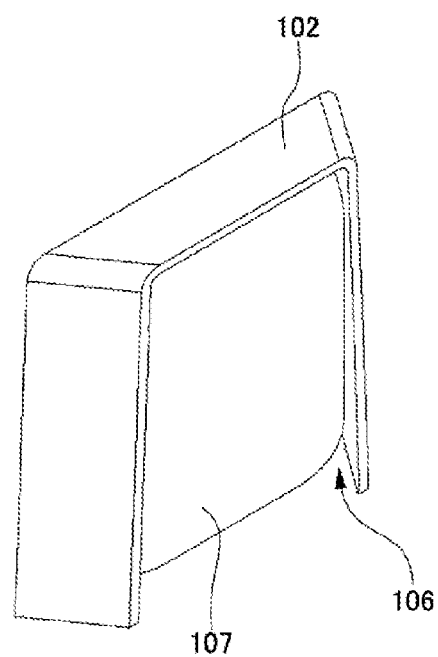
FIG. 15 is a perspective view showing the manner in which a pouch is set on an agent retaining portion of a second cover in the second embodiment.

When the pouch 107 is set in the air circulator 330, the second cover 102 is taken out of the first cover 101 and then the pouch 107 is set on the inside of the second cover 102, i.e., on the removing agent retaining portion 106, as shown in FIG. 15. At this time, by pushing the pouch 107 inwardly of the second cover 102 by utilizing the elasticity of the pouch 107, the pouch 107 can be held on the agent retaining portion 106 by making use of the reaction force generated by compression of the pouch 107.

Then, the second cover 102 having the pouch 107 set thereon is mounted to the first cover 101. Consequently, in the air circulator 330, the pouch 107 is disposed in the exhaust portion 108 while opposite to the fan 100 in the same manner as in the first embodiment.

If the air circulator 330 of the above-described structure is disposed in the receiving space 40 of the reagent storage unit 11 in place of the air circulator 33 of the first embodiment, advantageous effects similar to those provided by the first embodiment can be obtained.

Third Embodiment

Figure 16:
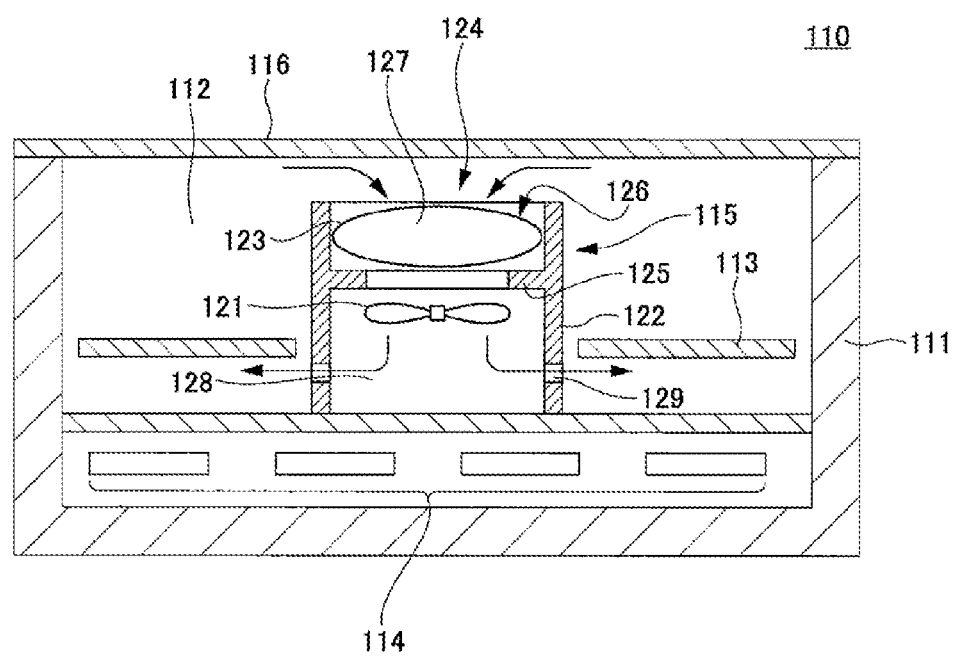
FIG. 16 is a side elevation in cross section showing the configuration of a reagent storage unit associated with a third embodiment of the present invention.

A third embodiment of the present invention is next described. FIG. 16 is a side elevation in cross section of a reagent storage unit associated with the third embodiment, illustrating its configuration. The configuration of the reagent storage unit, 110, of FIG. 16 is also applicable to the case where the first storage unit for receiving first reagent receptacles and the second storage unit for receiving second reagent receptacles are independent of each other. The reagent storage unit 110 has a cylindrical reagent storage unit body 111. A receiving space 112 is formed inside the storage unit body 111. A turntable 113 is disposed in the receiving space 112 and has a rack capable of holding reagent receptacles (not shown) in their vertical posture. A cooling portion 114 for cooling the receiving space 112 is disposed at the bottom of the reagent storage unit body 111.

An air circulator 115 is disposed inside the reagent storage unit body 111, i.e., in the receiving space 112, while utilizing the space in the vicinity of the center of rotation of the turntable 113. The receiving space 112 is substantially closed off by closing the top opening of the reagent storage unit body 111 with a cover-like member 116.

The air circulator 115 has a fan 121 and a cylindrical cover 122 providing a cover over the fan 121. An intake portion 123 is formed on one side (upper side) of the direction of the center axis of the cover 122. The intake portion 123 has an intake port 124 that opens upward. The intake portion 123 has a stepped part 125 to thereby form a removing agent retaining portion 126. A pouch 127 is set on the agent retaining portion 126. The stepped part 125 protrudes radially inwardly from the inner surface of the cover 122. The pouch 127 is set on the agent retaining portion 126 while placed on the stepped part 125. The pouch 127 is similar in configuration to the pouch 93 shown in FIG. 10. An exhaust portion 128 is formed on the other side (lower side) of the direction of the center axis of the cover 122. The exhaust portion 128 has an exhaust port 129 that opens laterally.

In the reagent storage unit 110 of the above configuration, when the fan 121 of the air circulator 115 is rotated, air in the upper layer inside the receiving space 112 is aspirated from the intake port 124 into the intake portion 123. At this time, if analysis hindering components are contained in the air flow drawn into the intake portion 123, the hindering components flow into the pouch 127 together with the air flow. Consequently, the removing agent constituting the pouch 127 removes the analysis hindering components. As a result, for the air flow sucked into the fan 121 through the pouch 123, the analysis hindering components have been already removed by the removing agent. Thus, the air flow expelled to the exhaust portion 128 and thence to the receiving space 112 via the exhaust port 129 by the rotation of the fan 121 is cleaned. The exhaust port 129 opens into the vicinity of the bottom of the receiving space 112. In consequence, the exhaust port 129 provides an air flow into the lower layer in the receiving space 129. The air flow then enters the receptacle placement region on the turntable 113. The air flow then is sucked into the intake port 124 from the upper layer in the receiving space 112. As a result, the analysis hindering components present in air can be removed while circulating the air in the receiving space 112.

Modified Embodiments and Others

It is to be understood that the technical scope of the present invention is not restricted to the foregoing embodiments but rather embraces various modifications and improvements within the range in which certain effects obtainable by constituent components of the invention or their combinations can be derived.

For example, in the first embodiment above, a reagent storage unit for accommodating reagent receptacles is taken as one example of a cool box. The present invention is not limited to this example. The invention is also applicable either to a cool box for accommodating the liquid receptacles 22 or to a cool box accommodating the analyte receptacles 21. Liquids received in the receptacles are not limited to reagents and analytes. They may also be diluted liquids and other kinds of liquid.

The removing agent retaining portion on which a removing agent is set may be formed on any one or both of the intake portion and the exhaust portion of each air circulator.

In order to design the cool box compactly, it is desired to place the air circulators inside the body of the cool box. However, the circulators may be placed outside the body of the cool box in achieving intended purposes.

What is claimed is:

1. An automatic analyzer adapted to analyze analytes and equipped with a cool box;
wherein the cool box comprises: a box body having a receiving space configured to accommodate therein receptacles for receiving liquid; a cover-like member configured to close the receiving space by closing a top opening of the box body; and at least one air circulator having an intake portion, a fan, and an exhaust portion, the at least one air circulator operating to suck air from the receiving space through the intake portion and to exhaust the sucked air into the receiving space through the exhaust portion by rotation of the fan, whereby circulating the air inside the receiving space that is closed;

wherein the at least one air circulator further comprises at least one agent retaining portion on which an inhibitor removing agent is set, the inhibitor removing agent acting to remove components adversely affecting or inhibiting analysis of analytes, from the air circulating inside the receiving space;

wherein the at least one agent retaining portion is formed in at least one of the intake portion and the exhaust portion; and wherein the cool box further comprises a cooling portion for cooling the receiving space of said box body of the cool box, the cooling portion provided on a bottom of the box body of the cool box external from the at least one air circulator, and wherein said exhaust portion exhausts air toward the cooling portion.

2. The automatic analyzer as set forth in claim 1, wherein said intake portion has an intake port for sucking air from an upper layer in said receiving space, said exhaust portion has an exhaust port for discharging air into a lower layer in the receiving space, the intake port is placed above a depth-wise midpoint of the receiving space and opens upward into the receiving space, and the exhaust port is located below the depth-wise midpoint of the receiving space and opens downward into the receiving space.

3. The automatic analyzer as set forth in claim 1, wherein said at least one air circulator is disposed inside said box body of the cool box.

4. The automatic analyzer as set forth in claim 1, wherein said at least one agent retaining portion is formed in said exhaust portion.

5. The automatic analyzer as set forth in claim 1, wherein said at least one agent retaining portion is configured to accommodate and hold a bag-like body containing said inhibitor removing agent.

6. The automatic analyzer as set forth in claim 1, wherein said at least one air circulator is one pair of air circulators disposed inside said cool box, and wherein each air circulator of the one pair of air circulators is disposed on an inner surface of an opposing sidewall of said box body of the cool box.

7. The automatic analyzer as set forth in claim 1, wherein said at least one air circulator has a cover assembly that covers said fan, and wherein said at least one agent retaining portion is formed inside the cover assembly.

8. The automatic analyzer as set forth in claim 7, wherein said cover assembly has a first cover to which said fan is mounted and a second cover configured to be detachably attached to the first cover, and wherein said at least one agent retaining portion is formed on the second cover.

9. The automatic analyzer as set forth in claim 1, wherein said cover-like member has aliquoting holes, and wherein the cover-like member closes off said receiving space except for the aliquoting holes by closing the top opening of the box body of the cool box.

10. The automatic analyzer as set forth in claim 9, wherein said aliquoting holes are formed to face a flow channel for air sucked into said intake portion.

11. The automatic analyzer as set form in claim 1, further comprising a pouch comprising a bag-like body that contains the removing agent, the pouch being set on the at least one agent retaining portion of the air circulator.

12. The automatic analyzer as set forth in claim 11, wherein the removing agent is in a cottony or fibrous form.

13. A cool box for use in an automatic analyzer for analyzing analytes, comprising:

a cool box body having a receiving space configured to accommodate therein receptacles for receiving liquid;

a cover-like member configured to close the receiving space by closing a top opening of the box body;

a cooling portion for cooling the receiving space of the cool box body and provided on a bottom of the box body external from the at least one air circulator; and an air circulator having an intake portion, a fan, and an exhaust portion and operating to circulate air in the receiving space that is closed by sucking air from the receiving space through the intake portion and discharging the sucked air into the receiving space through the exhaust portion by rotation of the fan;

wherein the air circulator further comprises at least one removing agent retaining portion on which a removing agent for removing components adversely affecting analysis of analytes from the air circulating inside the receiving space is set, the at least one removing agent retaining portion being formed on at least one of the intake portion and the exhaust portion, and wherein said exhaust portion exhausts air toward the cooling portion.

* * * * *

UNITED STATES PATENT AND TRADEMARK OFFICE
CERTIFICATE OF CORRECTION

| | | |
|---|---|---|
| PATENT NO. | : 11,959,844 B2 | Page 1 of 1 |
| APPLICATION NO. | : 17/389653 | |
| DATED | : April 16, 2024 | |
| INVENTOR(S) | : Takashi Yaginuma et al. | |

It is certified that error appears in the above-identified patent and that said Letters Patent is hereby corrected as shown below:

In the Claims

Column 20, Line 18, Claim 11, delete "form" and insert -- forth --

Signed and Sealed this
Sixth Day of August, 2024

Katherine Kelly Vidal
*Director of the United States Patent and Trademark Office*